Nov. 11, 1952 J. A. HUTTON 2,617,979

MODULATING REFLEX KLYSTRONS

Filed Nov. 23, 1949

Inventor
JAMES ALAN HUTTON
By Blair & Black
Attorney

Patented Nov. 11, 1952 2,617,979

UNITED STATES PATENT OFFICE 2,617,979

MODULATING REFLEX KLYSTRONS

James Alan Hutton, Cambridge, England, assignor to Pye Limited, Cambridge, England, a British company Application November 23, 1949, Serial No. 128,946
In Great Britain November 24, 1948

9 Claims. (Cl. 332—7)

The present invention relates to a method of and apparatus for producing amplitude modulated signals by means of a reflex klystron.

In varying the power output of a reflex kylstron by varying the potential of the resonator with respect to the cathode, the frequency of the oscillation also changes so that if a modulating signal is applied between these electrodes the resultant signal is both amplitude and frequency modulated. The power output and frequency of a reflex klystron may also be varied by varying the potential of the reflector with respect to the cathode.

According to the present invention, a reflex klystron is modulated by applying the modulating signal to both the reflector and the resonator in such a manner that the frequency of the oscillation remains constant and the resultant output is modulated in amplitude only.

In one method of carrying out the invention, the modulating signal is fed through two modulators respectively feeding the reflector and resonator, the modulators being so related that variations in frequency due to the signals being fed to the two electrodes is compensated and the resultant output is amplitude modulated.

If the relationship between the resonator potential and the reflector potential for constant frequency is substantially linear, the modulating signal may be fed to a voltage divider network connected across the high tension supply, to appropriate points on which the reflector and resonator are connected. For example the modulating signal may be fed to the control electrode of an amplifying valve, for example, to the grid of a triode, the anode of which is connected to an appropriate point on a voltage divider network, which may comprise a plurality of series-connected resistances, connected across the high tension supply, the resonator and reflector of the reflex klystron also being connected to appropriate points on the voltage divider network. For example, the resonator may be connected to the anode of the triode and the reflector be connected to a more negative point on the voltage divider network than that to which the resonator is connected. By careful adjustment of the points of connection to the voltage divider network, frequency variations may be accurately compensated so that the resultant output is modulated in amplitude only.

In order that the invention may be more clearly understood, reference will now be made to the accompanying drawings, in which.

Figure 1:
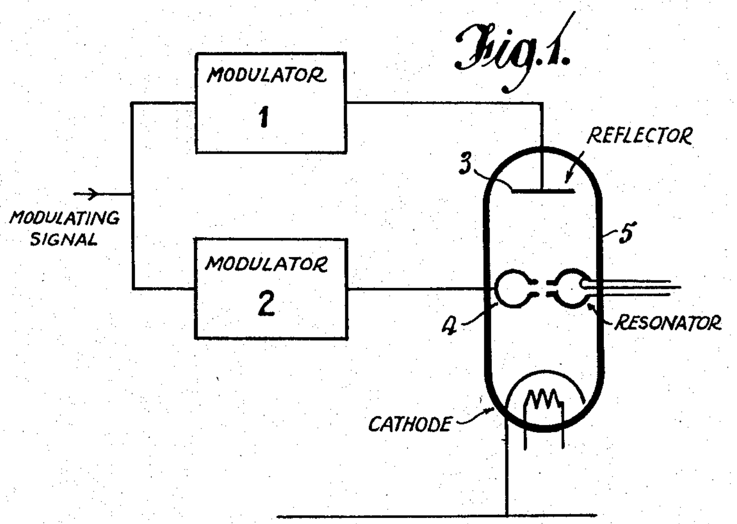
Fig. 1 shows a circuit diagram of one arrangement for carrying out the invention.

Referring to Fig. 1, the modulating signal is fed through two modulators 1, 2, feeding respectively the reflector 3 and resonator 4 of the klystron 5. The modulators are so related that variations in the frequency of the oscillations in the klystron resulting from the signals fed to the two electrodes 3 and 4 compensate one another, whereby the resultant output is modulated in amplitude only.

Figure 2:
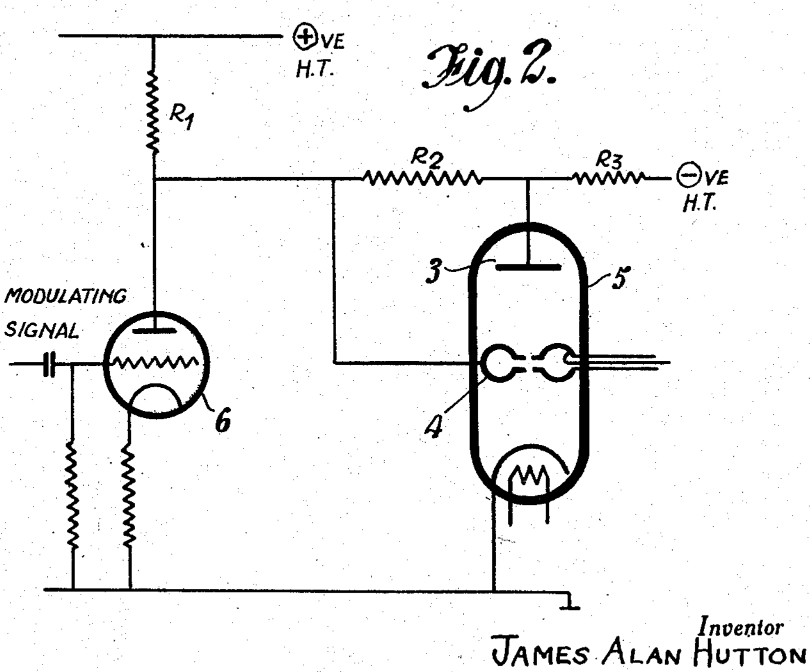
Fig. 2 shows a circuit diagram alternative arrangement.

The modified circuit arrangement as shown in Fig. 2 can be used when the relationship between the resonator potential and the reflector potential is substantially linear for constant frequency. In this modification the modulating signal is fed to the grid of a triode 6, the anode of which is connected to an appropriate point on a voltage divider network constituted by the series connected resistors R1, R2, R3, connected across the high tension supply. The resonator 3 and reflector 4 of the reflex klystron 5 are connected to appropriate points on the voltage divider network whereby the frequency variations are compensated and the resultant output is modulated in amplitude only. In the embodiment shown, the resonator 4 is connected to the anode of the triode and the reflector 3 is connected between the resistors R2 and R3.

While particular embodiments have been described it will be understood that various modifications may be made without departing from the spirit of the invention.

I claim:

1. Apparatus for producing amplitude modulated signals by means of a reflex klystron, wherein the klystron is modulated by applying the modulating signal to both the reflector and the resonator of the klystron, the relationship between the modulating potentials applied to said reflector and resonator being such that the frequency of the oscillations of the klystron remains constant and the resultant output is modulated in amplitude only.

2. Apparatus as claimed in claim 1, wherein the modulating signal is fed through two modulators respectively feeding the reflector and resonator, the modulators being so related that variations in frequency due to the signals being fed to the two electrodes is compensated and the resultant output is amplitude modulated.

3. Apparatus for producing amplitude modulated signals, comprising a reflex klystron having a reflector, a resonator and a cathode, a high tension supply, means for applying a modulating signal to a voltage divider network connected across the high tension supply, and means connecting the reflector and resonator to appropriate points on the voltage divider network, whereby the frequency of the oscillations produced by the klystron remains constant and the resultant output is modulated in amplitude only.

4. Apparatus as claimed in claim 3, wherein the modulating signal is fed to an amplifying valve, the output of which is connected to an appropriate point on the voltage divider network connected across the high tension supply, to appropriate points on which voltage divider network, the resonator and reflector of the klystron are also connected.

5. Apparatus as claimed in claim 4, wherein the resonator is connected to the anode of the amplifying valve, and the reflector is connected to a more negative point on the voltage divider network than that to which the resonator is connected.

6. Apparatus comprising a reflex klystron and means for feeding a modulating signal to both the reflector and resonator of said klystron.

7. Apparatus comprising a reflex klystron having a reflector and a resonator, two modulators, means for applying a modulating signal to each of said modulators and means for feeding the outputs from said modulators respectively to the reflector and resonator.

8. Apparatus comprising an amplifying valve having input and output electrodes, a source of high tension supply, a voltage divider network connected across said source of high tension supply, a connection between the output electrode of said amplifying valve and a point on said voltage divider network, a reflex klystron having a reflector and a resonator, means connecting said reflector and resonator respectively to different points on said voltage divider network, and means for feeding a modulating signal to the input electrode and said amplifying valve.

9. Method of producing amplitude modulated signals by means of a reflex klystron, which consists in applying the modulating signal to both the reflector and resonator of said klystron and in varying the relationship between the modulation potentials applied to said reflector and said resonator so that the frequency of the oscillations produced by the klystron remains constant and the resultant output is modulated in amplitude only.

JAMES ALAN HUTTON.

REFERENCES CITED

The following references are of record in the file of this patent:

UNITED STATES PATENTS

| Number | Name | Date |
|---|---|---|
| 2,409,591 | Salzberg | Oct. 15, 1946 |
| 2,492,168 | Marker | Dec. 27, 1949 |